Patented Sept. 8, 1942

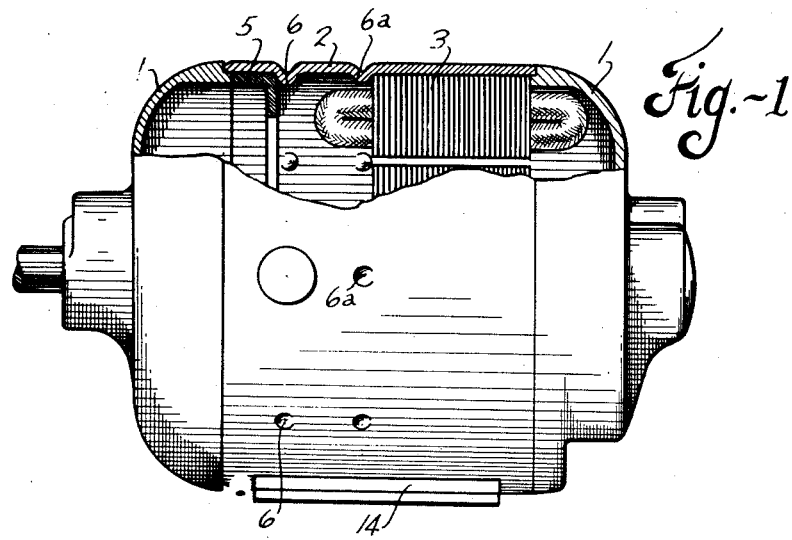
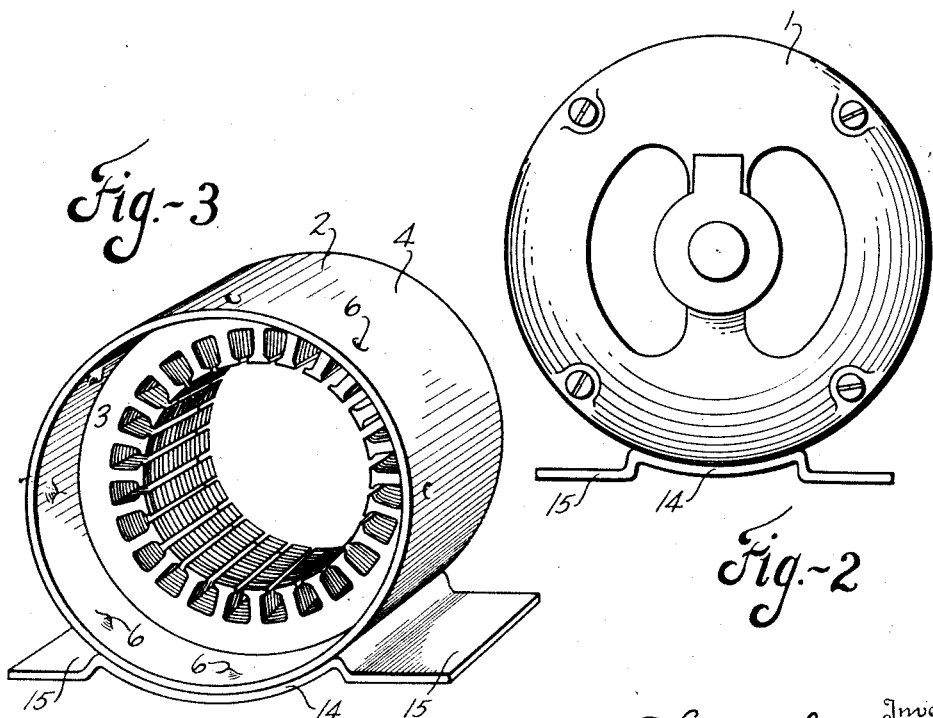

2,295,203

UNITED STATES PATENT OFFICE 2,295,203

FIELD RING

Victor L. Darnell, Dayton, Ohio, assignor to The Master Electric Company, Dayton, Ohio, a corporation of Ohio Application January 26, 1940, Serial No. 315,812

6 Claims. (Cl. 171—252)

This invention pertains to electric motors, generators and the like, and more particularly to an improved field and brush ring assembly thereof.

Heretofore it has been customary to construct motor housings of cast metal in three sections, comprising the opposite heads or end bells and an intermediate annular section which must be bored to size to receive the stator or field ring and brush ring and otherwise finished to fit the heads or end bells. Such operations not only add to the cost of manufacture, but also materially increase the weight of the finished motor.

The present construction and mode of manufacture and assembly is designed to obviate the necessity for such heavy cast metal housing and minimize expensive machining operations, by forming a welded plate metal or sheet metal ring within which the field laminations have a tight press or shrink fit, and by distorting limited areas thereof by relatively cheap punching or spinning operations or by welding stops therein to afford suitable abutments for brush ring location.

The object of the invention is to improve the construction as well as the means and mode of assembly of dynamo electric machines, whereby they will not only be efficient in use but may be more economically manufactured, of less weight, sturdy construction, and unlikely to get out of repair.

A further object of the invention is to provide an improved field ring or stator assembly.

A further object of the invention is to provide an improved method of field ring assembly and an improved method of providing stop abutments within the assembly.

A further object of the invention is to provide a motor assembly embodying the advantageous structural features and inherent meritorious characteristics hereinafter mentioned.

With the above primary and other incidental objects in view as will more fully appear in the specification, the invention intended to be protected by letters patent consists of the features of construction, the parts and combinations thereof, and the mode of operation, or their equivalents, as hereinafter described or illustrated in the accompanying drawings.

Figure 4:
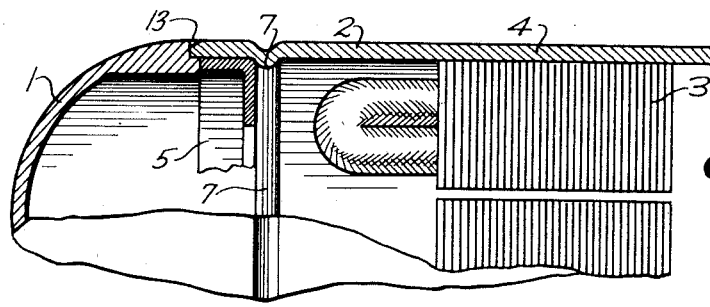
Figures 5, 5A:
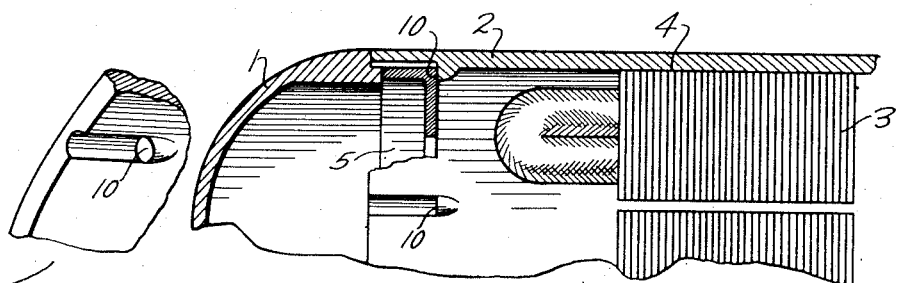
Figure 6:
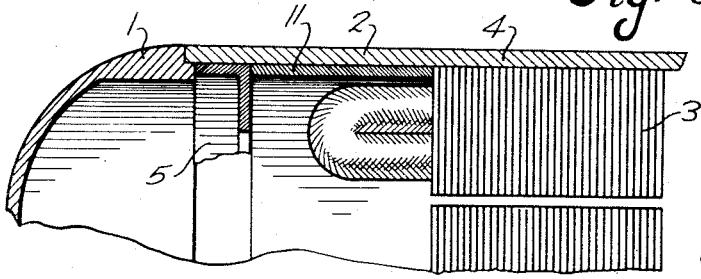
Figure 7:
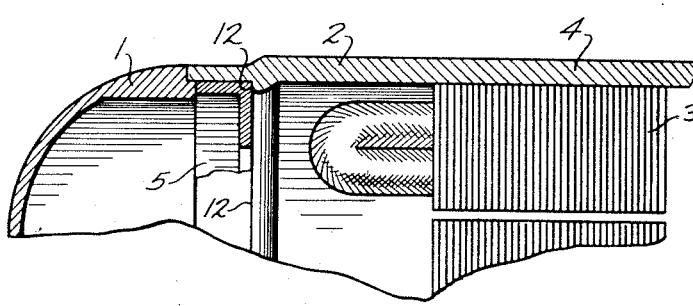

In the drawings, wherein is shown the preferred but obviously not necessarily the only forms of embodiment of the invention, Fig. 1 is a side elevation of an assembled electric motor, partly broken away, in which the present invention is embodied. Fig. 2 is an end elevation thereof. Fig. 3 is a perspective view of the field ring assembly removed from the motor. Fig. 4 is a detail sectional view illustrating a modification of the construction disclosed in Figs. 1 and 3. Figs. 5, 6 and 7 are similar detail sectional views illustrating various forms of embodiment of the invention. Fig. 5a is a perspective view of a fragmentary part of the form of the invention shown in Fig. 5.

Like parts are indicated by similar characters of reference throughout the several views.

In the drawings there is illustrated an electric motor, of which 1—1 are the heads or end bells, which are rabbeted to receive the intermediate field mounting section 2. Ordinarily the field ring laminations are enclosed in an annular cast metal housing section which is relatively heavy and which requires sundry expensive machining operations to adapt it for use.

In lieu of such heavy cast metal casing, the assembly of stator laminations 3, in the present instance, are surrounded by a welded band 4 of relatively thin plate or sheet metal, which is not only of less weight, but of greater tensile strength than the customary cast metal housing section, and will withstand hard usage with less likelihood of breakage. The band 4 is rolled and welded closely to size, whereby the laminae will be secured therein with tight press or shrink fit, without preliminary machining.

It is customary to assemble in the same motor section a mounting ring 5 for commutator brushes, which is ordinarily abutted against a shoulder or within a rabbet machined within the conventional cast metal housing ring. In the present instance such locating or limiting means may be variously formed within the welded band 4. In Figs. 1 and 3 the band 4 is exteriorly indented at circumferentially spaced intervals, thereby forming interiorly of the ring small protuberances 6—6 against which the brush mounting ring 5 may abut. If so desired, a second similar series of protuberances 6a may be provided, as limiting stops against which the laminae 3 may be abutted. Such indentations may be formed in the exterior periphery of the band by relatively cheap punching operations, thereby minimizing cost of production.

In lieu of indenting the enclosure band 4 at circumferentially spaced intervals, the indentation may be continuous as at 7, Fig. 4. Such indentation may be rolled in the band or formed by a spinning operation, thereby producing an internal bead or rib 8 against which the brush mount ring may abut. To preserve a smooth uniform exterior surface and enhance the appearance of the band 4, the stop abutments or protuberance may be formed by indenting the interior surface of the band and thereby displacing the material into lugs without disturbing the exterior face of the band.

In Fig. 5 there is shown such alternative punch formed abutment stops wherein the band is subjected to forming pressure in an axial direction by which narrow indentations 9 are formed at circumferentially spaced intervals in the interior face of the band, and the material removed therefrom is distorted into a series of spaced lugs 10 against which the brush ring 5 engages.

A very simple adaptation of the invention is that illustrated in Fig. 6 wherein a supplemental stop ring 11 is welded interiorly of the band 4. Such ring may be relatively narrow and serve only as an abutment for the brush mount ring 5, but is preferably of sufficient width to afford a stop at one side for the brush mount ring and at its opposite side for the field laminae. Such construction requires no machining operation whatever and the two rings or bands 4—11, which fit one inside the other, are easily assembled and welded to each other in their adjusted relation by unskilled workmen.

A further adaptation of the the improved construction, which however involves a machining operation, and hence is less desirable, is that illustrated in Fig. 7. In such embodiment one side margin of the band 4 is contracted by spinning as indicated at the left of Fig. 7, and thereafter an interior portion of the contracted margin is removed to form a rabbet or interior shoulder 12 against which the brush ring 5 may abut. The internal diameter of such reduced portion and the original internal diameter of the band are equal, hence the brush mounting ring and field laminae 3, to be assembled in any of the other embodiments of the invention illustrated, may with equal facility be assembled in the form shown in Fig. 7.

In assembling the enclosure band about the field laminations, the band 4 may be preformed and the assembly of laminae, either with or without the coil winding therein, may be subsequently inserted in the preformed band, or the band may be rolled about the previously assembled field structure and welded in situ. Such punching, rolling or spinning operations as may be necessary to provide brush ring abutments may be either previously or subsequently formed. The heating of the band incident to welding causes sufficient expansion that upon subsequent cooling a shrink fit upon the laminae is effected. Otherwise, the band material may be pre-heated to achieve such result.

If necessary to insure accurate fit with the rabbeted end bells or heads 1, the extreme edges of the band 4 may be slightly inturned by spinning, as at 13, Fig. 4, and a slight machine cut made interiorly of the inturned edge, to size the band for close fitting engagement of the heads or end bells. Ordinarily, however, the band is initially constructed sufficiently close to size to make such additional operation unnecessary.

In lieu of forming and welding the band 4, sections of preformed metallic tubing of suitable size and weight may be employed, and if preheated preparatory to insertion of the field laminae, may be shrunk thereon, or the laminae assembly may be pressed thereinto.

To support the assembled motor, a lightweight stamped plate or sheet metal saddle 14, contoured to agree with the curvature of the band 4 and having opposite uniplanar wings 15 is welded to the band 4 as is shown in Fig. 2.

The construction described not only greatly reduces the weight of the finished motor and provides an unusually strong construction not subject to breakage, but it also very materially reduces the costs of production.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a dynamo-electric machine assembly, a field ring comprising a group of laminae, a brush mounting ring, a band of sheet metal surrounding the field ring and brush mounting ring, a plurality of interior axial indentations in the band and protuberances formed by the indentations thereof affording stop shoulders for at least one of said rings.

2. A dynamo-electric machine casing, including end bells, a field ring comprising a group of laminae, a brush mounting ring and an intermediate section comprising a band of sheet metal surrounding the field ring assembly and the brush mounting ring and abutting the end bells, said band being indented, and spaced interior stop shoulders formed by such indentation and against which the field and brush rings respectively abut.

3. A field ring mount for a dynamo-electric machine, comprising an endless circular band of sheet metal enclosing a field ring and a brush mounting ring, including an inwardly projecting offset interiorly of the band intermediate the field ring and brush ring positions.

4. A field and brush ring mount for a dynamo-electric machine, comprising a continuous circular band of sheet metal enclosing a group of field ring laminations and a brush ring, and an annular ring located interiorly of the band in spaced relation with one end thereof and forming spaced internal stop shoulders therein to maintain the field and brush ring in relatively separated relation.

5. A field ring mount for a dynamo-electric machine, comprising a sheet metal tube having a smooth exterior surface enclosing a group of field ring laminae, and a brush mounting ring, and an internal integral stop shoulder projecting intermediate the field ring laminations and the brush mount ring.

6. The herein described method of mounting a dynamo-electric field ring and brush ring, including the steps of inserting a group of field ring laminations in a preheated tube cooling the heated tube thereby shrinking the tube into tight-fit engagement with the laminations and deforming the interior surface of the tube thereby providing stop shoulders for the brush ring.

VICTOR L. DARNELL.